United States Patent Office 3,459,232
Patented Aug. 5, 1969

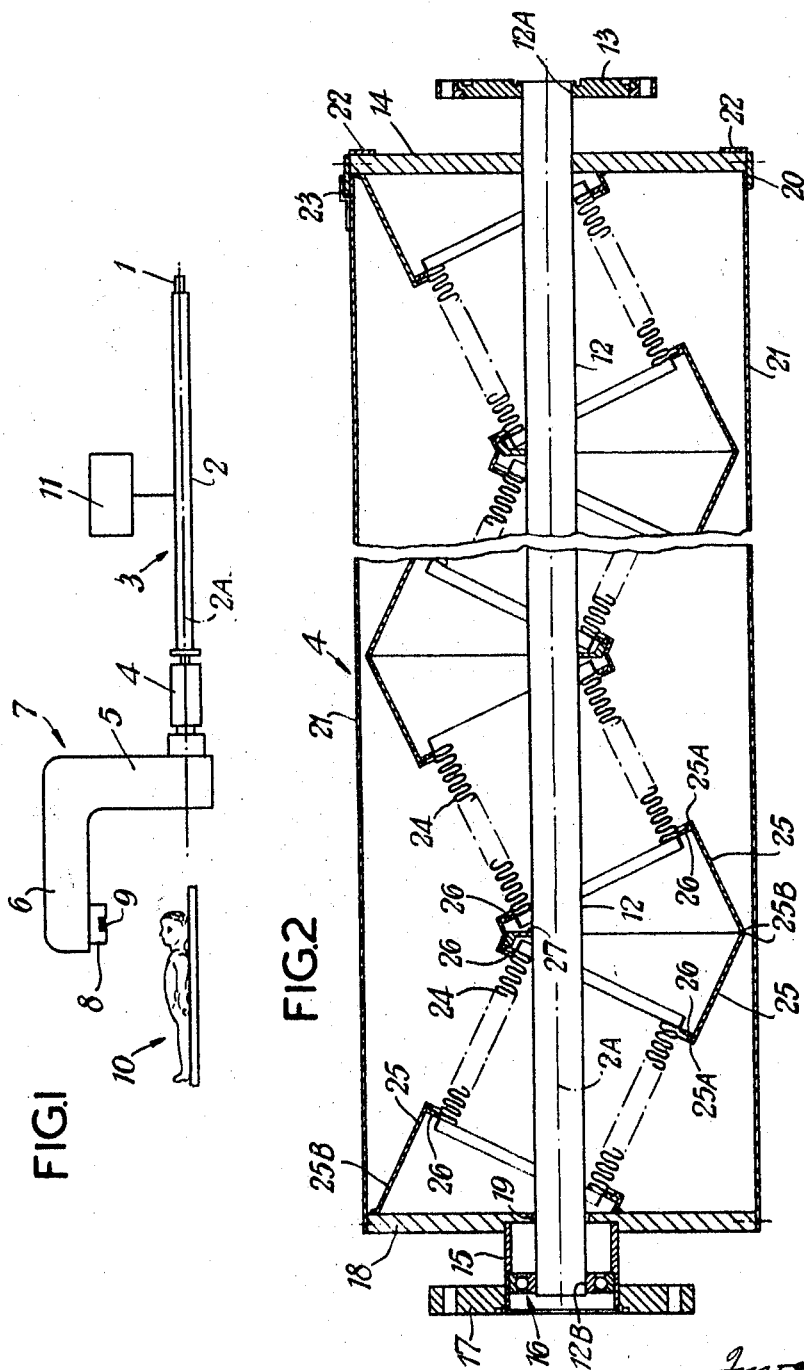

3,459,232
VACUUM-TIGHT DEVICE WITH INCLINED INTERCONNECTED ANNULAR BELLOWS
Malcolm Frederick Parkins, Ilford, England, assignor to Vickers Limited, London, England, a British company
Filed May 11, 1966, Ser. No. 549,234
Int. Cl. F16l 11/12, 11/14, 51/02
U.S. Cl. 138—103                             4 Claims

ABSTRACT OF THE DISCLOSURE

This application discloses a sealing device forming a fluid-tight passageway extending between first and second members relatively rotatable about an axis passing along the passageway, the device comprising a series of end-to-end interconnected annular bellows the axis of each of which is inclined with respect to the first-mentioned axis, each end of each bellows, except the two ends at the opposite ends of the series of bellows, being joined in fluid-tight manner to an adjacent end of an adjacent bellows by annular means that maintains the axes of the adjacent bellows oppositely inclined with respect to the first-mentioned axis, said two ends that are at opposite ends of said series being respectively secured in fluid-tight manner by further annular means to said first and second members, a guide tube which with said passageway extends through said series of bellows and said annular means, the guide tube having an axis coinciding with the axis passing through the passageway and spacers between the guide tube and said annular means.

---

This invention relates to sealing devices.

According to the present invention there is provided a sealing device forming a fluid-tight passageway extending between first and second members that are relatively rotatable about an axis that passes along the passageway, the device comprising a series of end-to-end interconnected annular bellows the axis of each of which is inclined with respect to the first-mentioned axis, each end of each bellows, except the two ends at the opposite ends of the series of bellows, being joined in fluid-tight manner to an adjacent end of an adjacent bellows by annular means that maintains the axes of the adjacent bellows oppositely inclined with respect to the first-mentioned axis, said two ends that are at opposite ends of said series being respectively secured in fluid-tight manner by further annular means to said first and second members, said passageway extending through said bellows and said annular means.

For a better understanding of the invention and to show how the same may be carried into effect reference will, by way of example, now be made to the accompanying drawings, in which:

FIGURE 1 is a diagrammatic side elevation of an X-ray apparatus irradiating a patient, and FIGURE 2 is a longitudinal sectional view, to an enlarged scale, of a high-vacuum sealing device employed in the apparatus of FIGURE 1.

The X-ray apparatus has an electron gun 1 at one end of the horizontal tube 2 of a linear electron accelerator 3, the other end of the tube 2 being connected by the high-vacuum sealing device 4 to an elongated vacuum-tight cavity (not shown) that extends along and within the arms 5, 6 of a gantry 7. The arm 5 of the gantry 7 is mounted for rotation about the axis 2A of the tube 2, this arm extending perpendicularly from said axis and the arm 6 extending horizontally from the free end of the arm 5. The inner surface of the free end of the arm 6 carries a head 8 containing a target 9. In operation of the apparatus the electron gun 1 produces electrons which travel along the tube 2 and are accelerated whilst so travelling, the electrons passing from the tube 2 through said sealing device 4 into the cavity within the gantry 7. Magnets (not shown) in the arms of the gantry 7 cause appropriate bending of the electron paths so that the electrons pass from the axis 2A along the arm 5, then along the arm 6 and finally into the head 8 whereby they strike the target 9 and give rise to X-rays for irradiating the patient 10. Vacuum pumping equipment 11 is provided for exhausting the accelerator 3, the cavity in the gantry 7, and the interior of the sealing device 4. The vacuum equipment 11 reduces the pressure to $10^{-7}$ torr or less.

In use of the X-ray apparatus the gantry 7 can be swung about the axis 2A whilst the accelerator 3 remains stationary. The relative movement between the gantry 7 and the accelerator 3 is accommodated by the sealing device 4.

Referring now to FIGURE 2, the sealing device 4 has a guide tube 12 on the end 12A of which is secured a disc 13 adapted to be secured in vacuum-tight mannner to the end of the tube 2 remote from the gun 1, with the interior of the end 12A communicating with the interior of the adjacent end of the tube 2. A circular plate 14 is secured coaxially on the tube 12 adjacent the disc 13. The end 12B of the tube 12 has a ring 15 rotatably mounted thereon through the intermediary of a ball bearing 16. The ring 15 carries a disc 17 which is adapted to be secured in vacuum-tight manner to the gantry 7, with the interior of the end 12B communicating with said cavity. The ring 15 also carries a circular plate 18 similar to the plate 14 except that the tube 12 passes through a central aperture 19 in the plate 18 with clearance. The plate 14 carries on its periphery a ring 20 that projects from the plate 14 towards the plate 18. A sleeve 21 co-axial with the tube 12 has one end thereof secured on the periphery of the plate 18, the opposite end of the sleeve 21 being in sliding engagement with the inner surface of the projecting part of the ring 20. An annular scale 22 graduated in degrees is mounted on the peripheral part of the plate 14 and co-operates with a pointer 23 carried by the sleeve 21.

The part of the tube 12 that is between the plates 14 and 18 is enclosed by a series of annular bellows 24 that are connected together by cylindrical elements 25 and rings 26. The axis of each bellows 24 is inclined with respect to the axis of the guide tube 12 and the axes of adjacent bellows 24 are oppositely inclined with respect to the axis of the guide tube 12. The axis of the guide tube coincides with the axis of the accelerator tube 2. One end 25A of each element 25 lies in a plane perpendicular to the axis of the element 25. Each end 25A has one of the rings 26 secured therein in vacuum-tight manner by welding, the inner periphery of each ring 26 being secured in a vacuum-tight manner to one end of one of the bellows 24. The other end 25B of each element 25 lies in a plane that is oblique to the axis of the element 25. The end 25B of each element 25, except the two at opposite ends of the series of interconnected bellows 24, is connected in vacuum-tight manner to the end 25B of another element 25 such that the axes of the two associated bellows 24 are inclined one with respect to the other. The two elements 25 at the ends of the interconnected series of bellows 24 each has its end 25B secured in vacuum-tight manner by welding to the adjacent plate 14 or 18 as the case may be. The guide tube 12 passes through the elements 25, bellows 24 and rings 26. A spacer 27 in the form of a segment of a ring is secured to each connected pair of elemnts 25 at the point of closest approach of these elements 25 to the guide rod 12. The spacer 27 maintains the adjacent bellows ends clear of the guide tube 12.

It will be understood that in use of the X-ray apparatus, vacuum is maintained inside the guide tube 12, inside the ring 15 and inside the passageway formed by the interconnected bellows 24 and cylindrical elements 25. When the gantry 7 is turned with respect to the electron linear accelerator 3, the disc 17 turns relative to the disc 13. The ring 15, plate 18 and sleeve 21 therefore turn relative to the plate 14 and scale 22. Each bellows 24 bends, successive spacers 27, starting from the plate 14, being displaced a successively greater extent. In effect, the series of interconnected bellows 24 bends around the tube 12 and thus allows the rotation of the plate 18 with respect to the plate 14. The extent of rotation is indicated by the movement of the pointer 23 around the scale 22. The electrons passing from the accelerator 3 to the gantry 7 pass through the tube 12 which prevents the interconnected bellows 24 and the parts attached thereto from obstructing the electron flight path.

Although the sealing device has been described as being employed in an X-ray apparatus it is to be understood that it is not limited to being used in such an apparatus but can be widely used for forming a fluid-tight passageway between two members that are relatively rotatable about an axis that passes along the passageway. For example, the sealing device could also be employed for conveying corrosive or highly-reactive fluids between two relatively rotatable members. With such fluids conventional sliding seals would be inappropriate. A sealing device as described above could also be employed in place of conventional sliding seals under high and low temperature conditions that might adversely affect conventional sliding seals.

I claim:

1. A sealing device forming a fluid-tight passageway, the device comprising first and second spaced members between which the passageway extends, said members being relatively rotatable about an axis that passes along the passageway, a series of annular bellows disposed end-to-end through which the passageway extends, the axes of adjacent bellows being oppositely inclined with respect to the axis passing along the passageway, annular means joining in fluid-tight manner each end of each bellows, except the two ends at the opposite ends of the series of bellows, to the adjacent end of the adjacent bellows, and two further annular means respectively securing in fluid-tight manner said two ends that are at opposite ends of said series of bellows to said first and second members.

2. A device as claimed in claim 1 and further comprising a guide tube passed through said bellows, said annular means, said two further annular means and said first and second members, the axis of the guide tube coinciding with the axis passing along the passageway, one of said members being secured on the tube and the tube passing through the other said member in a manner permitting turning of this member about the tube, and spacers acting between the guide tube and said annular means for maintaining the bellows ends clear of the guide tube.

3. A device as claimed in claim 2, wherein the guide tube passes through said other member with clearance.

4. A device as claimed in claim 2, wherein said spacers are carried by said annular bellows.

References Cited

UNITED STATES PATENTS

| 2,626,359 | 1/1953 | Weber | 313—148 X |
| 3,230,409 | 1/1966 | Farrell | 313—148 X |

FOREIGN PATENTS

| 693,608 | 9/1964 | Canada. |

ROBERT SEGAL, Primary Examiner

D. O'REILLY, Assistant Examiner

U.S. Cl. X.R.

138—120, 148; 250—52